US007241978B2

(12) United States Patent
Iwamoto

(10) Patent No.: US 7,241,978 B2
(45) Date of Patent: Jul. 10, 2007

(54) COOKING HEATER

(75) Inventor: Masayuki Iwamoto, Osaka-fu (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/381,145

(22) Filed: May 2, 2006

(65) Prior Publication Data

US 2006/0289512 A1 Dec. 28, 2006

(30) Foreign Application Priority Data

May 25, 2005 (JP) ............................ 2005-151992

(51) Int. Cl.

*F24C 7/02* (2006.01)
*A21B 2/00* (2006.01)
*A21B 3/02* (2006.01)
*A21B 1/40* (2006.01)

(52) U.S. Cl. ...................... 219/414; 219/391; 219/685; 219/722; 219/492; 126/197

(58) Field of Classification Search .................... None
See application file for complete search history.

(56) References Cited

U.S. PATENT DOCUMENTS 3,699,307 A * 10/1972 Malkin ...................... 219/492
4,323,747 A * 4/1982 Takase et al. ............... 126/197

FOREIGN PATENT DOCUMENTS

| | | | |
|---|---|---|---|
| JP | 03-045820 | | 2/1991 |
| JP | 06-109257 | | 4/1994 |
| JP | 11-237053 | | 8/1999 |
| JP | 2004293834 A | * | 10/2004 |
| JP | 2005009696 A | * | 1/2005 |

* cited by examiner

*Primary Examiner*—Joseph M. Pelham
(74) *Attorney, Agent, or Firm*—Renner, Otto, Boisselle & Sklar, LLP

(57) ABSTRACT

The present invention provides a cooking heater which continues cooking without apparently stopping the operation of the cooking heater when a door switch is momentarily turned OFF due to a shock during operation of the cooking heater though the door is not actually opened as far as continuation of the OFF-state is within a predetermined range. Upon receiving a door opening signal, a timer of control means starts counting and when a first period lapse judgment section judges that the count time exceeds a first period T1, a central control section instructs a heating means control section to stop the operation of heating means. Then, before the count time is judged to exceed a second period T2, when a second period lapse judgment section receives a door closing signal, the central control section restarts the operation of the heating means and continues the operation of the cooking heater.

4 Claims, 8 Drawing Sheets

COOKING HEATER

The present application is based on and claims priority of Japanese patent application No. 2005-151992 filed on May 25, 2005, the entire contents of which are hereby incorporated by reference.

BACKGROUND OF THE INVENTION

1. Field of the Invention

The present invention relates to a cooking heater that heats an object to be cooked which is placed inside a heat chamber through an opened door.

2. Description of the Related Art

Conventionally, many cooking heaters with a front opening/closing door such as microwave oven have been proposed, and a forward pullout type cooking heater has also been proposed as a different type of cooker. Since the pullout type cooking heater is suitable in a relatively large structure, it is appreciated as one of cookers composing an integrated kitchen system. Reflecting upsizing and systematization of a kitchen in recent years, cookers are also being more and more diversified and unitized and a cook-top, pullout type cooker in which a microwave oven and electric oven are combined in a single unit has been proposed.

As an example of pullout type cooking heater, there has been proposed a cooking heater structured in such a way that a bottom plate which moves in synchronization with a front opening/closing door is "smoothly" slidable with respect to the apparatus body by means of a slide mechanism and the bottom plate is driven to open/close together with the opening/closing door by transmitting the output of a motor provided on the apparatus body through transmission means such as a pinion rack mechanism (see Japanese Patent Laid-Open Publication No. 3-45820 (line 5 at top left to line 16 at top right on page 3, FIG. 2 to FIG. 4)). The door opening/closing device is provided with a latch device which keeps the opening/closing door closed, a door opening/closing switch and a control circuit which receives a signal from this door opening/closing switch and drives a motor to open/close the opening/closing door, and pressing the door opening/closing switch automatically releases the latch and a driving force of the motor causes the opening/closing door to open/close in synchronization with the bottom plate.

As another example of the pullout type cooking heater, there has been proposed a cooking heater provided with a drawing member in which an object to be heated is housed in a drawable manner inside the cooker body, wherein when it is detected that the drawing member is drawn forward, electromagnet legs provided on the bottom face of the cooker body are excited so as to be attracted to a metal mount surface on which the cooker is placed (see Japanese Patent Laid-Open Publication No. 6-109257 (paragraph [0010], FIG. 1)). When the drawing member in which a large-volume object to be heated is placed is pulled out, the electromagnet legs are attracted to the metal mount surface, and therefore it has been intended to prevent the drawing member from losing its weight balance and toppling over forward from a kitchen counter.

As another example of the pullout type cooking heater, there has been proposed a microwave oven having a drawable structure with a movable food mount (see Japanese Patent Laid-Open Publication No. 11-237053 (paragraphs [0030] to [0035], FIG. 1)). This microwave oven provides a cooking container having an opening at the top such that it is freely drawable from the housing of the body of the microwave oven, the cooking container and a cover which covers the opening of the cooking container provided on the body housing side form a heat chamber which can trap micro wave. This microwave oven provides a choke groove between the perimeter of the opening of the cooking container and a cover facing this to prevent leakage of radio wave.

The applicant of the present invention proposes a cooking heater provided with a drawing member in which an object to be heated is accommodated in a manner drawable from the cooker body (Japanese Patent Application No. 2004-7384, Japanese Patent Application No. 2004-7385). According to the proposal of the former application, it is possible to eliminate the necessity for using expensive parts or materials having high thermal resistance and flame resistance to construct a movable mechanism, thereby reduce manufacturing costs and adopt a moving mechanism without being affected by micro wave irradiated into the heat chamber to thereby eliminate the possibility of discharge caused by micro wave. On the other hand, according to the latter application, it is possible to prevent a sudden boiling phenomenon that an overheated liquid is vaporized by a shock such as vibration when vibration caused by the opening/closing operation is applied to the object to be heated and the vapor is discharged at a stroke, causing the user to get burned and it is possible to control the moving speed of the opening/closing door so as to prevent the object to be heated from toppling over or liquid component from spilling due to the shock of the opening/closing operation. Furthermore, by constructing the moving mechanism without using expensive parts or materials having high thermal resistance and flame resistance, it is possible to reduce the manufacturing cost and cause the moving mechanism to have a structure unaffected by micro wave irradiated into the heat chamber and thereby eliminate the possibility of discharge caused by micro wave.

In the case of a composite cooking apparatus combining a cook-top section, microwave oven section and electric oven section in a single unit, if the door of the electric oven is closed with a bang when the microwave oven section is in use, reaction against the collision between the door of the electric oven and front plate causes a force to act on the door of the microwave oven section built in adjacent to the electric oven section in the door opening direction. The shock at this time may not cause the door of the microwave oven section to open, but may cause the latch head in the latch mechanism section to float momentarily. At that time, the latch switch turns OFF momentarily and a signal indicating that the door is opened is inputted to a control section of the microwave oven section. As for control of the microwave oven section, when, for example, an OFF-state of the latch switch of the door continues for 50 ms, for example, the door is judged to be opened, the operation of the microwave oven section is stopped and that information is displayed or alarmed by an operation display of the cooker or alarm sound or the like. When the operation of the microwave oven section stops and the user who becomes aware of the display or alarm responds to such stoppage of operation, cooking with the microwave oven section may be suspended for a long time, which makes continuation of cooking and post-treatment more complicated or may also result in an insufficient cooling condition. In the case of not only a composite cooker but also a cooking heater with a stand-alone pivoted door type microwave oven, when a person or an object may collide with the microwave oven directly or with the mount on which the microwave oven is placed and the microwave oven is strongly shaken, the operation of the microwave oven may be suspended for the similar cause of momentary opening of the door switch.

Even when the door switch is turned OFF momentarily due to a momentary shock acting on the door of the cooking heater, this may not lead to a situation in which the total operation of the cooking heater should be stopped. Therefore, based on such a judgment, there is a problem to be solved in trying to continue the operation of the cooking heater within a certain limit while securing safety.

It is an object of the present invention to provide a cooking heater capable of, when a force in the door opening direction is applied caused by a shock applied to the cooking heater during operation of the cooking heater, which may not cause the door to actually open but may momentarily turn OFF the door switch, apparently continuing the operation of the cooking heater without stopping it if the OFF-state is within a predetermined limit thus avoiding inconvenience of forcing the user to take complicated actions.

SUMMARY OF THE INVENTION

In order to solve the above described problems, the cooking heater of the present invention includes a door which opens/closes a heat chamber, heating means for heating an object to be cooked placed in the heat chamber, a door switch which detects the opening/closing of the door and control means for controlling the operation of the heating means based on the detection of the opening/closing of the door switch, wherein the control means stops the operation of the heating means upon detecting that a door opening detection period during which the opening of the door is continuously detected by the door switch during the operation of the heating means exceeds a first period, and while the operation of the heating means is stopped after the lapse of the first period, upon detecting that the door opening detection period is completed before exceeding a second period, the operation of the heating means is restarted.

According to this cooking heater, the control means controls the operation of the heating means based on the detection of the opening/closing of the door switch, but when the OFF-state of the door switch of the cooking heater continues over the first period, the control means judges that the door is opened and stops the operation of the heating means of the cooking heater by stopping the oscillation of microwave in the same way as in the conventional case. When the heating means uses microwave, microwave never leaks out of the door and safety is secured. Furthermore, even when the door switch remains OFF even after the lapse of the first period when, for example, an external force applies to the cooking heater, if the OFF-state of the door switch continues during the second period, though the operation of the heating means is stopped, the OFF-state of the door switch is not regarded to indicate that the door is open and the operation of the heating means is restarted upon detecting that the door switch is closed again. That is, the operation of the cooking heater is continued as if the stoppage of the operation of the heating means were temporary.

In this cooking heater, the first period is a period within a range of 25 ms to 100 ms and the second period is a period within a range of 100 ms to 500 ms after the first period starts. The first period is preferably a short period within a range centered on 50 ms and the second period can be set to a long period within a range centered on approximately 200 ms after the first period starts. When the first period is approximately 50 ms as in the conventional case, microwave or the like never leaks out of the door which is left open and safety is secured. On the other hand, the second period is set to approximately 200 ms because this is based on an empirical rule that such opening of the door that the closing of the door is detected within the second period is a temporary phenomenon and restarting the operation of the heating means can be judged to be allowed.

This cooking heater is a composite cooking device in which a cook-top section, microwave oven section and electric oven section are combined in a single unit and can be used in the microwave oven section. The microwave oven section uses irradiation of microwave and should avoid leakage of microwave, and therefore this cooking heater is preferably used to control the opening/closing of the door and irradiation/stoppage of microwave.

As described above, the present invention sets the period for judging whether or not the door of the cooking heater is open during the second period which is longer than the first period and though the operation of the heating means is stopped after the lapse of the first period, the operation of the heating means is restarted upon detecting that the door is closed before the second period is elapsed, and therefore the operation of the cooking heater is apparently continued. Moreover, even if the operation of the cooking heater seems to continue, the operation of the heating means is not actually continued during the second period during which the door switch is OFF and the operation of the heating means stops after the lapse of the first period in the same way as in the conventional case. In this way, the present invention realizes a cooking heater providing the same control over the operation of the heating means as the conventional control and with due considerations given to the safety aspect, too.

DETAILED DESCRIPTION OF THE PREFERRED EMBODIMENTS

Figure 1:
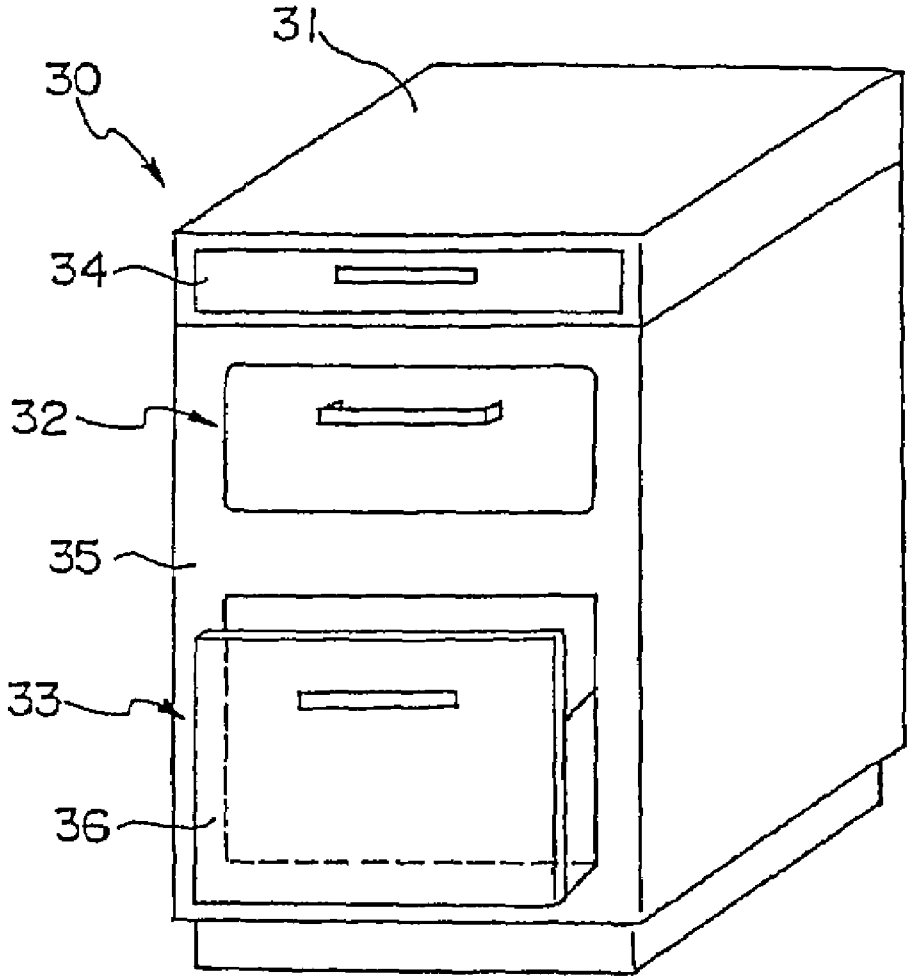
FIG. 1 is a perspective view showing overall appearance of an embodiment of a cooking heater according to the present invention.
Figure 4:
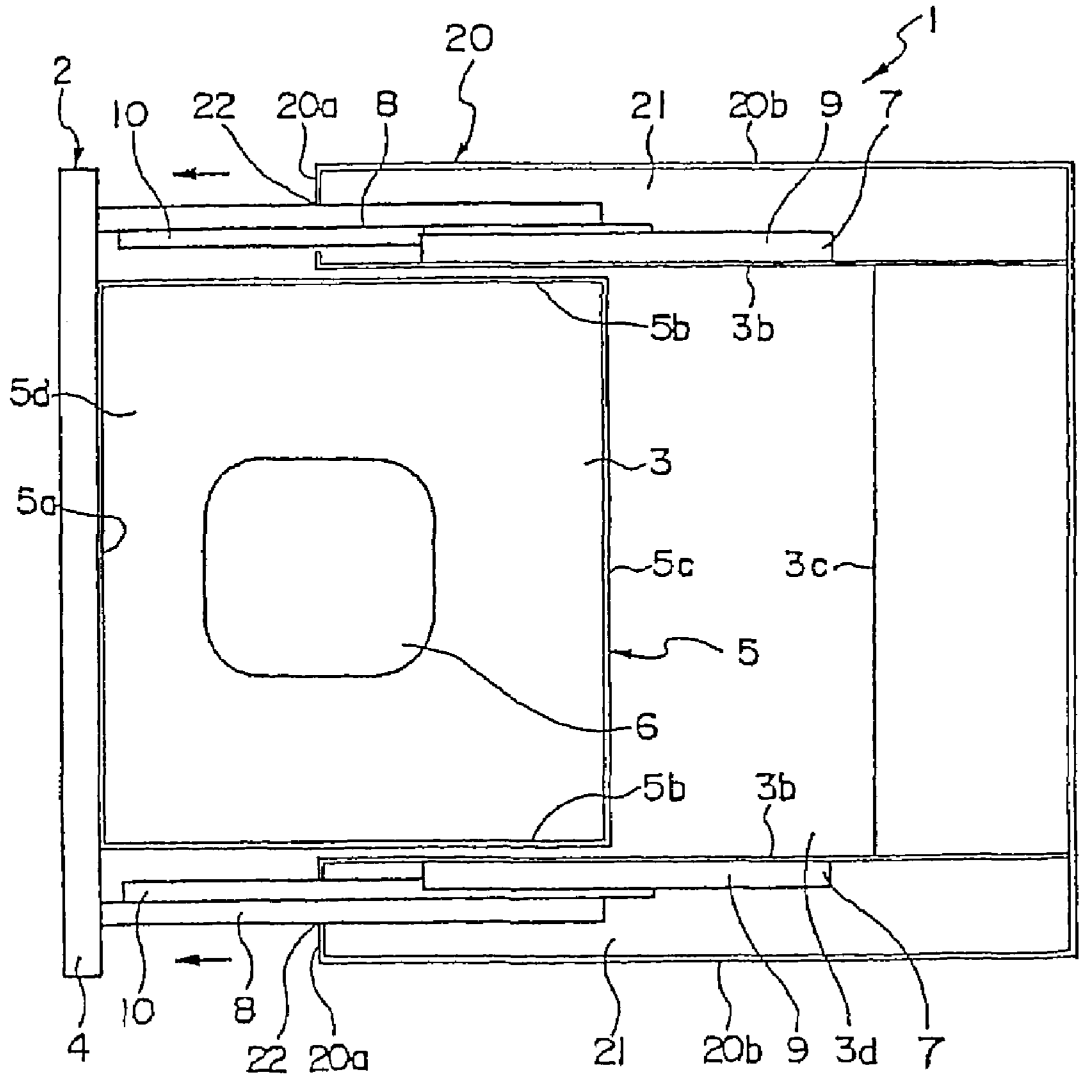
FIG. 4 is a horizontal cross-sectional view of the microwave oven section of the cooking heater shown in FIG. 1.
Figure 5:
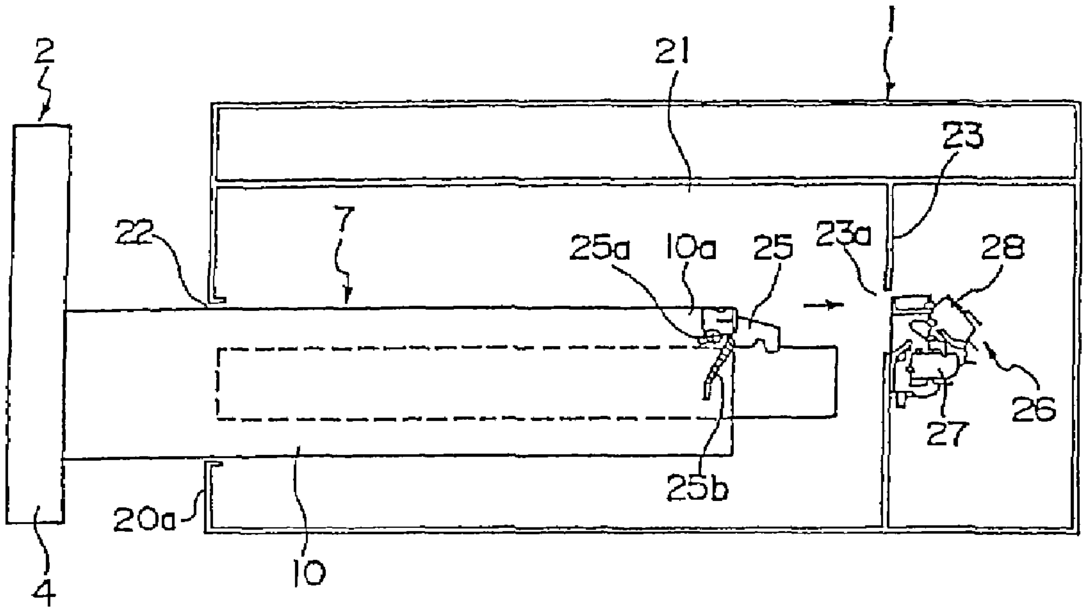
FIG. 5 illustrates a slide mechanism when the opening/closing door of the microwave oven section shown in FIG. 2 is in the process of closing.
Figure 6:
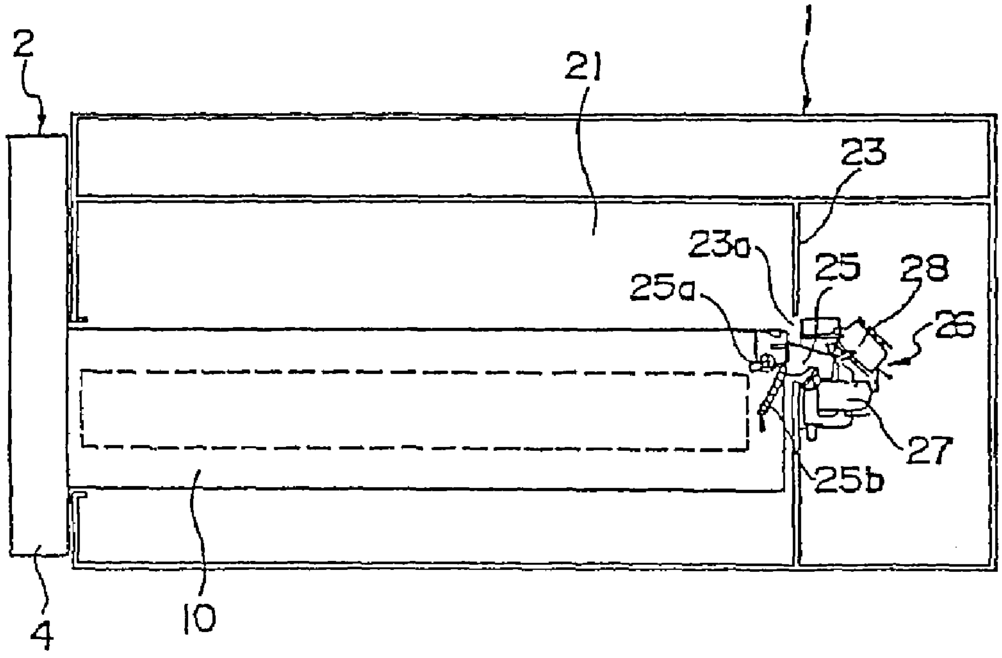
FIG. 6 illustrates the slide mechanism when the opening/closing door of the microwave oven section shown in FIG. 2 is closed.

With reference now to the attached drawings, an embodiment of the cooking heater according to the present invention will be explained below. FIG. 1 is a perspective view showing overall appearance of an embodiment of the cooking heater according to the present invention, FIG. 2 is a perspective view of the pullout type microwave oven used for the cooking heater shown in FIG. 1, FIG. 3 is a vertical cross-sectional view of the pullout type microwave oven of the cooking heater shown in FIG. 2, FIG. 4 is a horizontal cross-sectional view of the pullout type microwave oven of the cooking heater shown in FIG. 1, FIG. 5 and FIG. 6 are side views of the slide mechanism of the pullout type cooking heater shown in FIG. 1, FIG. 5 illustrates the drawing member positioned a little before a retracted position and FIG. 6 illustrates the drawing member which reaches the retracted position.

As shown in FIG. 1, the cooking heater is a composite cooking device 30 in which cook-top section 31, microwave oven section 32 and electric oven section 33 are combined in a single unit. The cook-top section 31 can be provided with a drawer 34 which can accommodate small cooking-related articles. The composite cooking device 30 is, for example, a cooking device which is accommodated next to other apparatuses in a kitchen and when the front plate 35 is viewed from the front, the cook-top section 31, microwave oven section 32 and electric oven section 33 are arranged in the vertical direction. Both the microwave oven section 32 and electric oven section 33 may be of a pullout type. Since the drawer 36 of the electric oven section 33 has a considerable amount of weight, when the drawer 36 is closed with a bang, the shock at that moment is transmitted to the pullout type microwave oven section 32 via the front plate 35.

Figure 2:
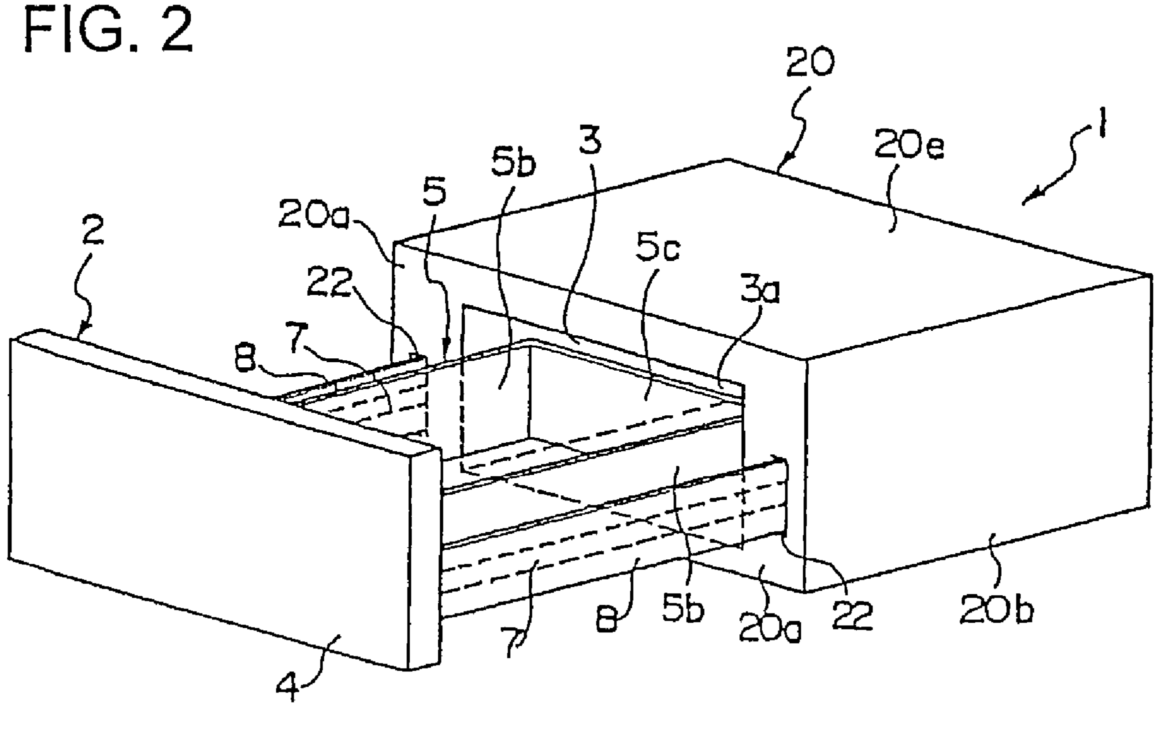
FIG. 2 is a perspective view of the microwave oven section of the cooking heater shown in FIG. 1.

As shown in FIG. 2, the pullout type microwave oven section 32 is provided with a microwave oven body 1 and a drawing member 2 which is drawable from the microwave oven body 1. A heat chamber 3 for cooking an object to be heated 6 placed on the drawing member 2 is formed inside the microwave oven body 1. In the front side of the heat chamber 3 is formed an opening 3*a* and the heat chamber 3 is formed by being surrounded by left and right side walls 3*b*, 3*b*, a back wall 3*c* connected to the side walls 3*b*, 3*b* at the back, a bottom wall 3*d* and top wall 3*e* connected to the side walls 3*b*, 3*b* and back wall 3*c*.

Figure 3:
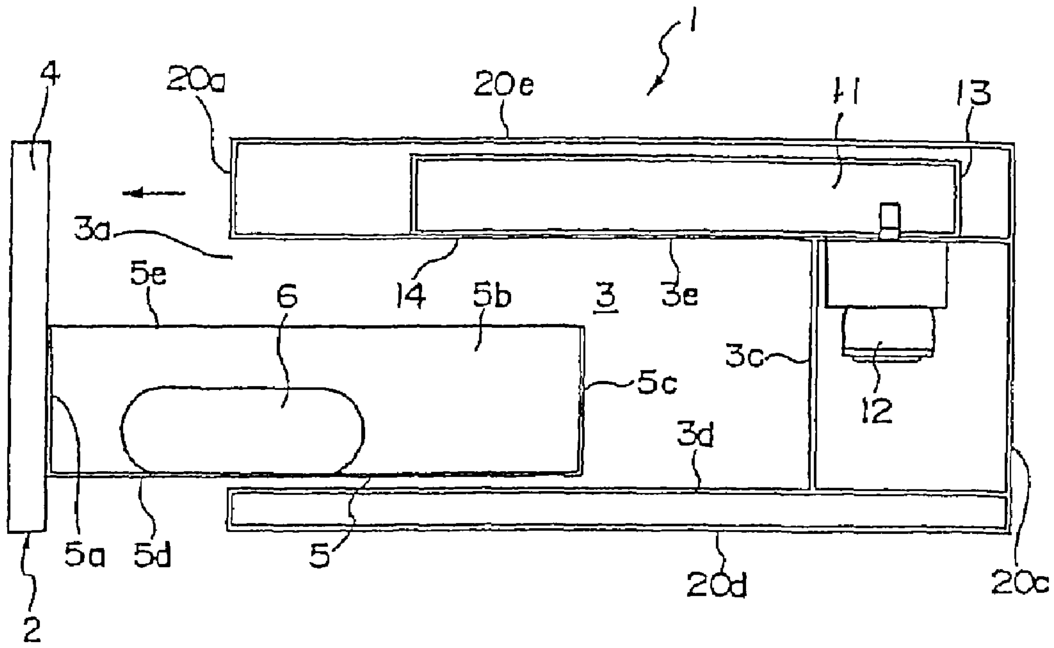
FIG. 3 is a vertical cross-sectional view of the microwave oven section of the cooking heater shown in FIG. 1.

The drawing member 2 is disposed in a manner movable inside the microwave oven body 1 by means of a slide mechanism, which will be described later, so that it can be drawn forward from within the heat chamber 3 of the microwave oven body 1 in the direction indicated by the arrow (FIG. 2 and FIG. 3). The drawing member 2 is provided with an opening/closing door 4 corresponding to the door of the present invention for opening/closing the heat chamber 3 and a cooking container 5 to which the opening/closing door 4 is attached for placing and accommodating the object to be heated 6. The cooking container 5 is provided with a front plate 5*a* which is attached to the opening/closing door 4, left and right side plates 5*b*, 5*b* which extend backward from the left and right sides of the front plate 5*a*, a back plate 5*c* which is connected to the side plates 5*b*, 5*b* at the back and a bottom plate 5*d* connected to the side plates 5*b*, 5*b* and back plate 5*c* and a container opening 5*e* is formed at the top to allow the object to be heated to be placed or removed.

The drawing member 2 is operable to move between a pullout position where the cooking container 5 is pulled out of the heat chamber 3 and a retracted position where the cooking container 5 is accommodated in the heat chamber 3. The cooking heater is provided with slide rails 7, 7 as a slide mechanism disposed outside the heat chamber 3 on the left and right sides so as to move the drawing member 2 inside the microwave oven body 1. When the drawing member 2 is in the retracted position, the opening/closing door 4 is in the position of closing the opening 3*a* of the heat chamber 3, and therefore the inner space of the heat chamber 3 becomes a hermetically sealed space by the inner wall of the microwave oven body 1 and the drawing member 2 preventing micro wave irradiated inside the heat chamber 3 from leaking out. When the drawing member 2 is in the pullout position, the cooking container 5 is sufficiently drawn forward from the heat chamber 3, which allows the object to be heated 6 to be placed or removed into/from the cooking container 5 through the container opening 5*e*.

Each of the slide rails 7 is provided with a fixed rail 9 attached to the microwave oven body 1 and a movable rail 10 which is attached to the drawing member 2 and slides along the fixed rail 9. The slide rails 7 may have a structure equivalent to that of slide rails for a drawer which is used for office furniture such as a cabinet and disk, and detailed explanations thereof will be omitted here As shown in FIG. 3 or FIG. 4, each fixed rail 9 is attached outside the side walls 3*b*, 3*b* which form the heat chamber 3 of the microwave oven body 1. Furthermore, each movable rail 10 is attached to the opening/closing door 4 via an L-figured angle member 8 attached in a manner extending from the inner side wall of the opening/closing door 4 of the drawing member 2 to the microwave oven body 1.

As shown in FIG. 3, a microwave generation device 11 is disposed around the heat chamber 3 inside the microwave oven body 1. The microwave generation device 11 is constructed of a magnetron 12 disposed behind the heat chamber 3 which generates microwave, a waveguide 13 disposed above the heat chamber 3 which propagates microwave generated by the magnetron 12. Microwave generated by the magnetron 12 propagates through the waveguide 13 and is irradiated from the power outlet 14 into the heat chamber 3.

As shown in FIG. 3, FIG. 4, the left and right slide rails 7 are provided in connection with passage boxes 21 formed in the microwave oven body 1 on the left and right sides of the heat chamber 3. That is, the microwave oven body 1 includes a front wall 20*a* around the opening 3*a* of the heat chamber 3, left and right side walls 20*b*, 20*b*, a back wall 20*c*, a bottom wall 20*d* and a top wall 20*e* as a housing 20. In the microwave-oven body 1, the passage boxes 21 are formed surrounded by parts of the side walls 20*b*, 20*b*, front wall 20*a*, back wall 20*c*, bottom wall 20*d* and top wall 20*e* of the housing 20 outside the side wall 3*b* of the heat chamber 3. The fixed rail 9 of each of the slide rails 7 is attached outside the side wall 3*b* of the heat chamber 3 in the passage box 21 and the movable rail 10 together with the L-figured angle member 8 can be placed/removed into/from the passage box 21 through an insertion hole 22 formed in the front wall 20*a*.

As shown in FIG. 5, an operation lever 25 for operating a microwave oscillation stop switch is provided on at least one of the slide rails 7, 7 at the back or preferably at a back most position 10*a* of the movable rail 10. The operation lever 25 is a movable lever which is pivotable at a pivoted point 25*a* with respect to the movable rail 10, urged by a spring 25*b* to rotate clockwise in the figure and balanced by an appropriate stopper in the state as illustrated.

The passage box 21 is provided with a partition wall 23 which partially partitions the interior and a window 23*a* is formed in the partition wall 23 to allow an end of the operation lever 25 to enter. In correspondence with the position of the operation lever 25 when the movable rail 10 is in the back most position 10*a*, a microwave oscillation stop switch (door switch) 26 is provided on the back of the partition wall 23 around the window 23*a*. The microwave oscillation stop switch 26 is provided with an oscillation switch 27 and a short-circuit switch 28. The switch for starting a count of a timer is the oscillation switch 27.

When the drawing member 2 is pushed in from the open state shown in FIG. 5 to the retracted position shown in FIG. 6, the operation lever 25 provided at the backmost position 10*a* of the movable rail 10 enters the window 23*a* of the partition wall 23 and causes the microwave oscillation stop switch 26 to turn ON. When the opening/closing door 4 is opened, the operation lever 25 detaches from the microwave oscillation stop switch 26, returns to the state shown in FIG. 5 and causes the switch 26 to turn OFF. Therefore, not only after cooking but also during cooking, when the opening/closing door 4 is opened, the power to the microwave generation device 11 is turned OFF disabling generation of microwave. The user can set how the cooking heater is actually heated and operated by operating other operation switches. (not shown). Furthermore, a main switch to start cooking is separately provided so that the user operates it with intent.

Figure 7:
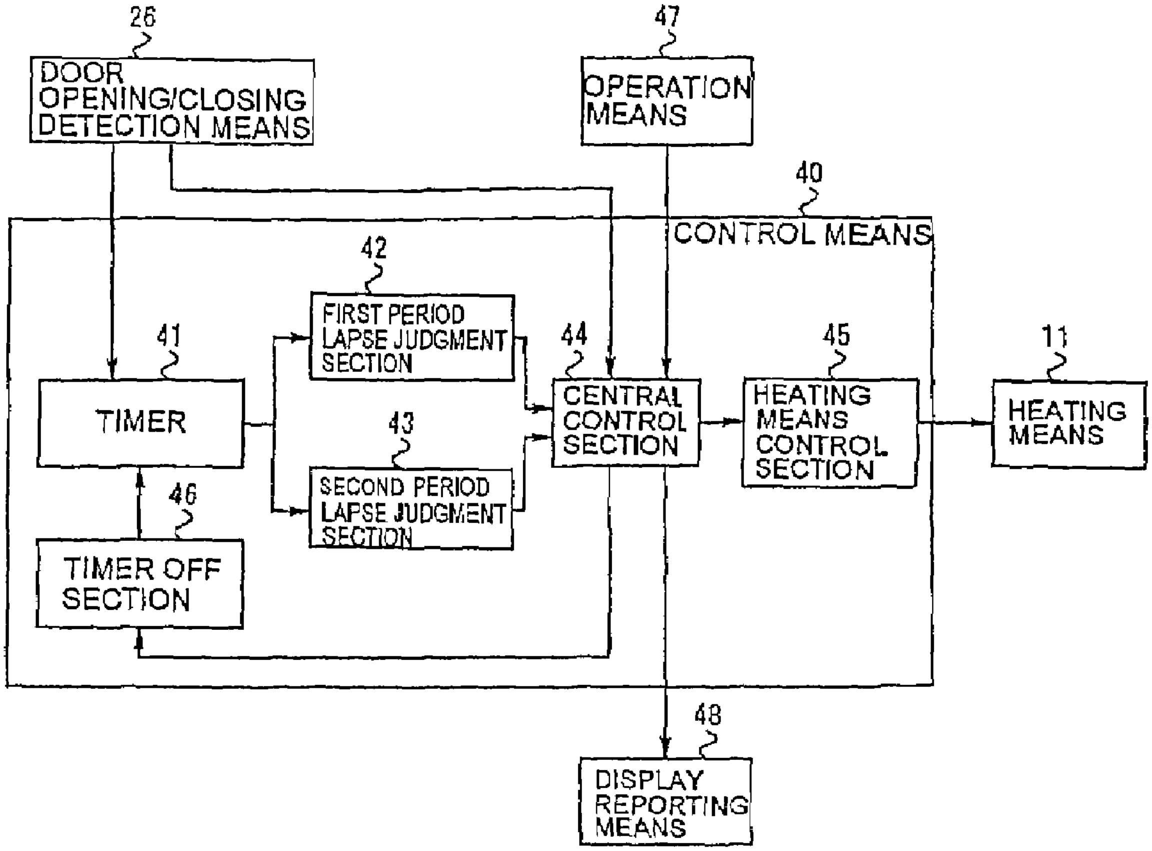
FIG. 7 is a block diagram of the microwave oven section of the cooking heater shown in FIG. 1.

FIG. 7 shows a block diagram of the cooking heater of the present invention, that is, a block diagram centered on the control means of the microwave oven section 32 of the cooking heater shown in FIG. 1. The control means 40 is provided with a timer 41 which receives the output of the microwave oscillation stop switch 26 as the door opening/closing detection means and a central control section 44. Upon receiving the count of the timer 41, a first period lapse judgment section 42 and a second period lapse judgment section 43 which judge a lapse of first period T1 and second period T2 respectively output the judgment results to the central control section 44. When the central control section 44 stops counting of the timer 41, it issues a stop command to a timer OFF section 46. When the user directly operates a cooking menuor the microwave oven section 32, the user enters a command from the operation means 47 and the operation signal is inputted to the central control section 44. The central control section 44 receives various signals from the door opening/closing detection means (microwave oscillation stop switch 26), operation means 47 and first period lapse judgment section 42 and second period lapse judgment section 43, carries out calculation and judgment and outputs output signals to the heating means (microwave generation device 11) and display/reporting means 48.

Figure 8:
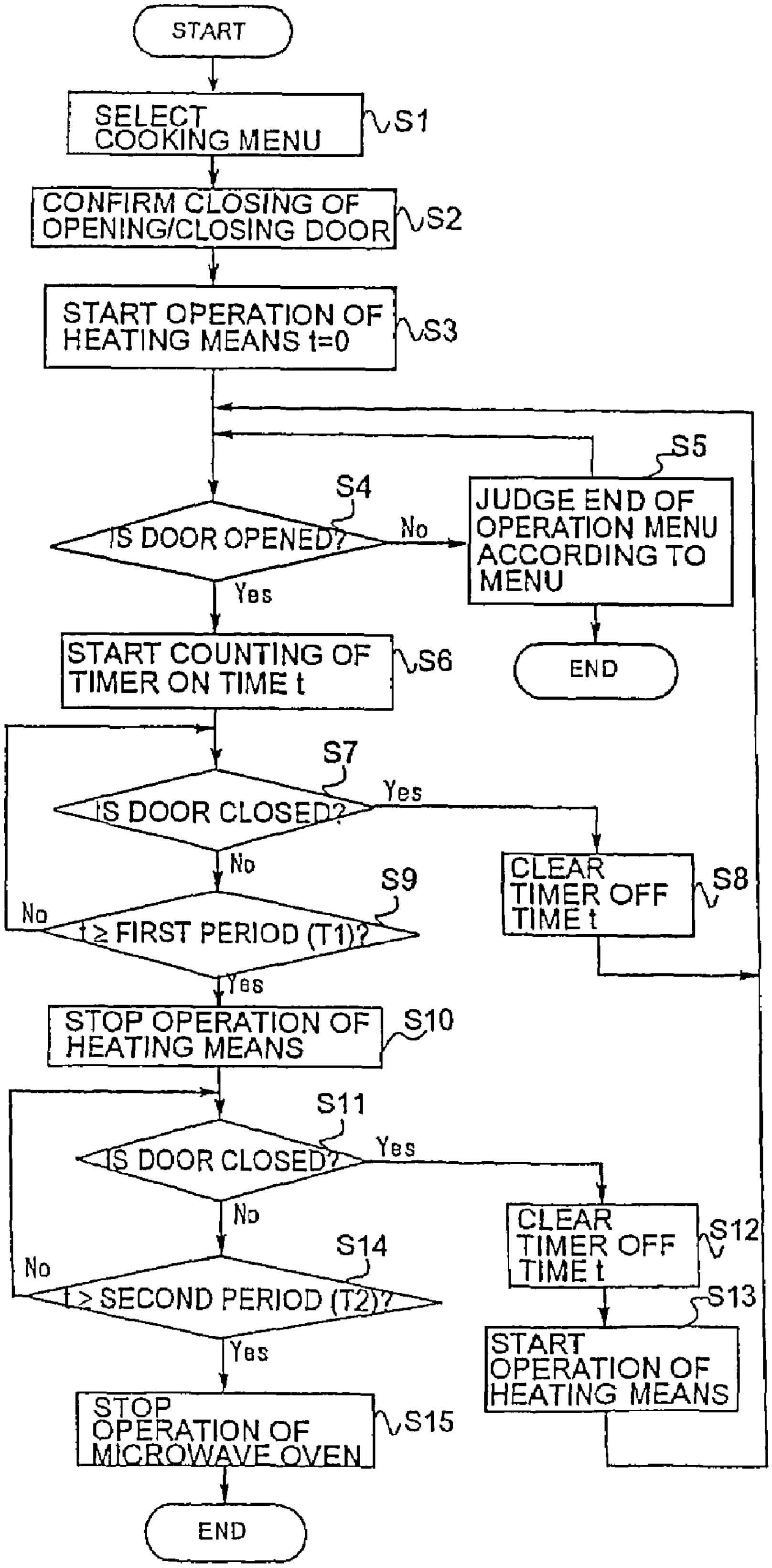
FIG. 8 is a flow chart showing an example of contents of control carried out by control means of the microwave oven section of the cooking heater shown in FIG. 1.

FIG. 8 is a flow chart showing an example of contents of control carried out by the control means of the cooking heater according to the present invention. According to FIG. 8, when the user places an object to be heated in the heat chamber of the microwave oven section 32 and selects a cooking menu or the like at the display/operation section (step 1, hereinafter abbreviated as "S1"), after the opening/closing door 4 is confirmed to be closed (door switch ON) (S2), the heating means is turned ON and the time count of the timer for measuring the first period and second period is set to 0 (S3). In order to prevent harmful microwave from leaking out, the opening/closing door 4 must be necessarily closed when the heating means is turned ON. When the heating means is turned ON, the heating means is activated according to the intensity and time of heating determined according to the cooking menu.

While the heating means is operating, it is judged whether or not the pullout type opening/closing door 4 of the microwave oven section 32 is opened (door switch OFF) (S4). If the opening/closing door 4 is closed, the heating means is activated according to the selected cooking menu (S5) S4 is repeated when the heating means is in operation, but the opening/closing door 4 of the microwave oven section 32 may be momentarily opened due to such an operation that the drawer of the electric oven section 33 is closed with a bang before cooking is completed. In this case, the door switch transitions to an OFF state, and therefore the judgment in S4 becomes "Yes" and the timer turns ON (S6). That is, a count starts by regarding a time t after the door is opened as a door opening detection period.

After the opening/closing door 4 is opened, it is judged whether or not the opening/closing door 4 is closed again (S7). When the opening/closing door 4 is closed again in an extremely short lapse of time of, for example, 50 ms (door switch ON), the count of the timer is stopped, the count value is cleared (S8) and the process returns to S4 and the operation continues. When the judgment in S7 shows that the opening/closing door 4 is still open (door switch OFF), it is judged whether or not the time t counted by the timer has exceeded a predetermined first period T1 (S9). The first period T1 is set to a period within a range of 25 ms to 100 ms, preferably a short period within a range centered on 50 ms to avoid microwave from leaking out with the opening/closing door 4 left open. When the judgment in 59 shows that the time t has not reached the first period T1, the process moves back to S7 and it is judged again whether or not the opening/closing door 4 is closed. When the judgment in S9 shows that the time t has reached the first period T1, the heating means is immediately stopped (S10). When the OFF-state of the door switch of the microwave oven section 32 continues beyond the first period T1 such as 50 ms, the opening/closing door 4 is judged to be left open. Since there is a possibility that microwave may leak out of the opening/closing door 4 which is left open, the control means 40 stops the heating means 11.

According to the present invention, it is judged whether or not the opening/closing door 4 is closed even after the heating means is stopped (S11). When the opening/closing door 4 is not closed, it is judged whether or not the time t counted by the timer has exceeded the second period T2 (S14). The second period T2 is set to a period within a range of 100 ms to 500 ms, preferably within a range of a relatively long period centered on 200 ms. The reason is that when an external force is applied to the microwave oven section 32, the door switch of the microwave oven corresponds to a maximum of 183 ms (condition under which the opening/closing door 4 is closed with a bang using a foot). In S14, when the time t has not exceeded the second period T2, the process moves back to S11 and it is judged whether or not the opening/closing door 4 is closed. The judgment in S11 judges that the opening/closing door 4 is closed before the time t exceeds the second period T2, the count of the timer is stopped and cleared (S12), the operation of the heating means is restarted (S13) and the process moves back to S4. Here, even if the time of the first period T1 is extended, when the door is opened, the door switch 26 which is placed in series in the circuit operates and an OFF-state is set, and therefore the operation is stopped and safety secured.

As explained above, the oscillation of microwave is stopped when the door switch 26 continues its OFF-state for 50 ms as in the conventional case. However, when the microwave oven section 32 is in operation, even if the door switch 26 is OFF for up to 200 ms, the door is not regarded to be open. When the OFF-state of the door switch 26 is judged to be 200 ms or less, control is performed so as to oscillate microwave again. For this reason, when an external force is applied in the direction in which the opening/closing door 4 is opened during the operation of the microwave oven section 32, and as a result, even if the door switch 26 is turned OFF momentarily, cooking of the microwave oven section 32 is stopped momentarily (while the door switch 26 is OFF), cooking is continued.

By changing the time for judging that the door of the microwave oven section 32 is open from 50 ms to 200 ms, it is possible to restart/continue the operation of the microwave oven section 32 regardless of the state of the opening/closing door 4 of the electric oven. Furthermore, the operation of the microwave oven section 32 is stopped when the OFF-state of the door switch 26 continues for 50 ms as in the conventional case. Various means other than the heating means, for example, turn table, illumination in the heat chamber, display means continue to operate, and therefore the microwave oven section 32 is apparently recognized to continue to operate. Thus, though cooking seems to continue for 200 ms during which the door switch 26 is actually turned OFF, the operation of the heating means of the microwave oven section 32 does not continue. The control of microwave oscillation remains unchanged from the conventional control whereby safety is considered, and therefore due considerations are given to the safety aspect, too.

The embodiment of the cooking heater according to the present invention has explained the case where it is applied to the microwave oven section, but in addition to this, the present invention is applicable to any cooking heater for which it is necessary to consider safety when the opening/closing door 4 is opened such as a steam type oven and the operation of the heating means is preferably restarted or continued as far as the opening of the opening/closing door 4 is momentary. Furthermore, it is obvious that the present invention is not limited to a pullout type cooking heater but it is also applicable to a cooking heater having a swing type door as the opening/closing door 4.

What is claimed is:

1. A cooking heater comprising:

a door which opens/closes a heat chamber;

heating means for heating an object to be cooked placed in the heat chamber;

a door switch which detects the opening/closing of the door; and control means for controlling the operation of the heating means based on the detection of the opening/closing of the door switch, wherein the control means stops the operation of the heating means upon detecting that a door opening detection period during which the opening of the door is continuously detected by the door switch during the operation of the heating means exceeds a first period, and while the operation of the heating means is stopped after the lapse of the first period, upon detecting that the door opening detection period is completed before exceeding a second period, the operation of the heating means is restarted.

2. The cooking heater according to claim 1, wherein the first period is a period within a range of 25 ms to 100 ms and the second period is a period within a range of 100 ms to 500 ms after the first period starts.

3. The cooking heater according to claim 1, wherein the cooking heater is a composite cooking device in which a cook-top section, microwave oven section and electric oven section are combined in a single unit and used in the microwave oven section.

4. The cooking heater according to claim 1, wherein the control means comprises a timer which starts time counting in response to a start of detection of an opening state of the door by the door switch, a first period lapse judgment section which judges whether or not the door opening detection period has exceeded the first period based on the time counting by the timer, a second period lapse judgment section which judges whether or not the door opening detection period has exceeded the second period based on the time counting by the timer, a heating means control section which controls the operation of the heating means and a central control section which outputs a control signal to the heating means control section regarding stoppage or restart of the operation of the heating means according to the judgment made by the first period lapse judgment section or second period lapse judgment section.

* * * * *